July 15, 1952           R. K. MOSHER           2,603,088

ELECTRICAL CIRCUIT FOR STRAIGHT COURSE NAVIGATION

Filed Oct. 19, 1945

*INVENTOR.*
RICHARD K. MOSHER
BY

*William D. Hall.*

ATTORNEY

Patented July 15, 1952

2,603,088

UNITED STATES PATENT OFFICE 2,603,088

ELECTRICAL CIRCUIT FOR STRAIGHT COURSE NAVIGATION

Richard K. Mosher, Cambridge, Mass., assignor, by mesne assignments, to the United States of America as represented by the Secretary of War Application October 19, 1945, Serial No. 623,406

5 Claims. (Cl. 73—178)

This application relates generally to electrical circuits and more particularly to computing circuits for determining the proper course to be flown by an aircraft.

One type of aircraft navigating system includes the use of means carried by the aircraft for interrogating two responding means located some distance apart on the ground, whereby the airborne means can measure the time elapsing between an interrogation and the response from each responding means to determine the distance from the aircraft to each of the two responding means. The airborne means may be one of a number of radio-echo detection systems, and the responding means may be a radio receiver and transmitter so arranged that said transmitter emits a coded series of radio-frequency pulses upon receipt by said receiver of a pulse from the radio object detection system. The responding means will be referred to hereinafter as beacons.

A navigation system as described above may be used for navigating an aircraft to a destination having predetermined distances from each of the two beacons, by flying in such a manner that the indications of range from the aircraft to the beacons eventually coincide simultaneously with the corresponding distances from the destination to each beacon. The path followed in approaching the destination is frequently a curvilinear path such as a circular arc or a portion of a hyperbola. It would, however, be desirable to fly a straight course, which has the advantages of being more direct and easier to maintain with precision. Accordingly, it is an object of this invention to provide means for directing the flight of an aircraft on a straight-line course to a destination having a predetermined location with respect to two beacons.

Other objects, features and advantages of this invention will become apparent from the following description taken in connection with the accompanying drawing in which.

Figure 1:
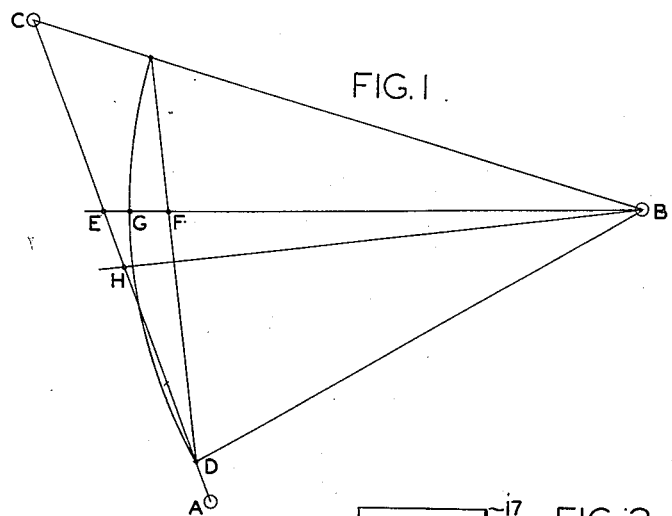
Fig. 1 is a diagram showing the geometry of the method of navigation herein described.

Reference is now made more particularly to Fig. 1 for an explanation of the geometry of navigation by the use of this invention. A and B represent the locations of the two beacons, and C the destination to be reached, the course to be flown being the straight line A—C. When the aircraft shall have been navigated to a point D, the location of which with respect to B is known, the range D—B to beacon B becomes known. As the flight proceeds thereafter, the range to beacon B, in the example illustrated, first decreases below and then increases above the initial range D—B. For example, at point E the deviation E—G from the original range D—B is equal to distance E—F minus distance F—G. It can be shown that the distance E—F is approximately proportional to the distance traveled from the initial point, D—E, and that, if the angle CBD is comparatively small, the angle EBH may be safely neglected so that the angle EFD effectively becomes a right angle, the distance F—G may be seen to be approximately proportional to a constant minus the square of the distance E—H. The line H—B is the bisector of the angle C—B—D. Accordingly, a voltage proportional to the difference between distances E—F and F—G will be required, to serve as a measure of distance E—G.

Figure 2:
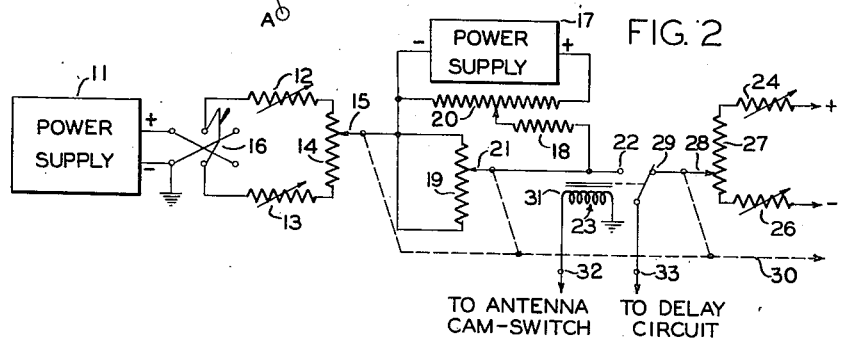
Fig. 2 is a schematic wiring diagram of one embodiment of this invention.

Reference is now made more particularly to Fig. 2 for a detailed explanation of this invention. Power supply 11 is connected to the series loop comprising variable resistors 12 and 13 and potentiometer 14, by means of switch 16. Power supply 17 is connected across what is in effect a squared term potentiometer comprising an adjustable voltage-divider 20, which applies a voltage to the series loop comprising resistor 18 and potentiometer 19, the ends of the latter being connected together. The movable contact 15 of potentiometer 14 is connected to the two ends of potentiometer 19, and the junction of movable contact 21 of potentiometer 19 and resistor 18 is connnected to stationary contact 22 of relay 23. The series loop comprising variable resistors 24 and 26 and potentiometer 27 is connected across a source of potential (not shown), movable contact 28 of potentiometer 27 being connected to stationary contact 29 of relay 23. The movable contacts 15, 21, and 28 of potentiometers 14, 19, and 27, respectively, are arranged to be driven simultaneously by a ground-speed shaft 30 indicated in Fig. 2 by broken lines. The resistance of the potentiometer including the closed loop element 19 thus varies as the square of the shaft setting. One end of operating coil 31 of relay 23 is connected to ground, and the other end to a terminal 32. The movable contact of relay 23 is connected to terminal 33. Potentiometers 14, 19, and 27 have linear windings.

It will be obvious to those skilled in the art that the potential difference appearing between contact arm 15 and ground is proportional to the anugular position of shaft 30 plus a constant; that if the value of resistor 18 be sufficiently large to maintain substantially constant current from power supply 17, the potential difference between contact arms 21 and 15 is then proportional to a constant less the square of the deviation of the angular position of shaft 30 from that position which it occupies when contact arm 21 is in its mid-position; and that the resutling potential difference appearing between contact 22 of relay 23 and ground exhibits the required variation provided that shaft 30 is driven at a speed proportional to the ground speed of the aircraft.

Resistors 12 and 13 are provided in order that the initial range D—B may be inserted, and that the correct rate of change of the linear term may be established. Switch 16 is connected as a simple reversing switch in order to allow navigation to a destination which is nearer to beacon B than to beacon A, since in this case the linear variation of range becomes negative. The voltage appearing at contact 29 of relay 23 is indicative of the track range being proportional to a constant plus the angular position of shaft 30. Relay 23 is arranged to apply either of the potentials at contacts 22 and 29 to terminal 33, depending upon whether relay 23 is energized or not. The output voltage at terminal 33 is used to produce an indication of the desired range relationship between the aircraft and the two beacons, which may then be compared with the actual range relationships in order to provide an indication of the corrections to be made in the flight path.

Figure 3:
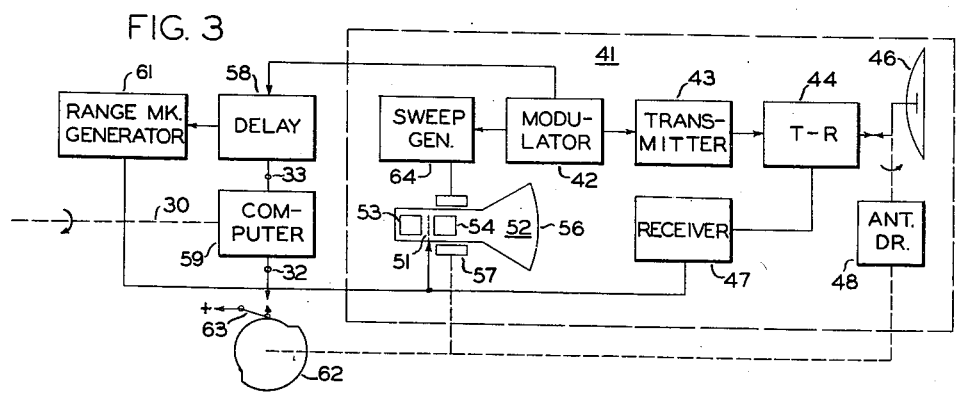
Fig. 3 is a block diagram of one system in which this invention may be used.

Reference is now made more particularly to Fig. 3 for an explanation of a typical system in which this invention may be used. Radio echo detection system 41 comprises a modulator 42, transmitter 43, transmit-receive (T-R) switch 44, antenna 46, receiver 47, and antenna drive motor 48. Modulator 42 produces a series of positive pulses which are applied to transmitter 43. Each pulse from modulator 42 causes transmitter 43 to generate a burst of radio-frequency oscillations, which are transmitted through T-R switch 44 to antenna 46 where they are radiated as a directional beam of radio-frequency energy. Echo pulses from reflecting objects as well as responses from beacons in the path of this beam are received by antenna 46 and passed through T-R switch 44 to receiver 47. The video pulses from receiver 47 are applied to intensity controlling grid 51 of cathode ray tube 52, which also includes electron gun 53, beam-forming electrodes 54, and fluorescent screen 56. Cathode ray tube indicator 52 is also equipped with a magnetic deflecting yoke 57, which is arranged to be driven by antenna drive motor 48 in synchronism with the rotation of antenna 46.

The voltage pulses produced by modulator 42 are also applied to a delay circuit 58 where they are delayed an amount proportional to the voltage received from a computer 59, which corresponds to the circuit illustrated in Fig. 2. Delay circuit 58 may be any circuit capable of delaying a voltage pulse by an amount proportional to a D.-C. voltage, for example, the delay multivibrator shown and described in the application by Britton Chance, Serial No. 512,931, now Patent No. 2,562,660, entitled "Pulse Generating Circuit," filed December 4, 1943. Such a delay multivibrator will produce a positive rectangular voltage pulse initiated by the pulse received from modulator 42 and lasting a period of time proportional to the voltage received from computer 59. Hence, a differentiating circuit, which is well known in the art, may be used to produce a negative voltage pulse coinciding with the trailing edge of each rectangular pulse produced by the delay multivibrator.

The negative pulses from delay circuit 58 are applied to a range mark generator 61 which may consist of any circuit capable of producing a positive voltage pulse simultaneously with each applied negative pulse. Positive pulses from range mark generator 61 are applied to beam intensity control grid 51 of cathode ray tube 52.

Antenna drive motor 48 also drives cam 62 synchronously with the rotation of antenna 46. Cam 62 has a raised portion which includes approximately one-half of its periphery, and is so arranged as to cause switch 63 to be closed during approximately one-half of each rotation and to allow switch 63 to be open during the other half of each rotation. Switch 63 is arranged to connect terminal 32 of computer 59 to a positive source of potential when closed. Cam 62 is made adjustable in angular position on the shaft driven by antenna drive motor 48 so that switch 63 is open when antenna 46 is pointed at beacon A and closed when pointed at beacon B, and so that the opening and closing of switch 63 occurs when antenna 46 is aimed approximately midway between the two beacons.

Ground-speed shaft 30 of computer 59 may be driven at a rate proportional to the ground speed of the aircraft by any convenient mechanism, for example, the displacement shaft of the Norden bomb sight.

Sweep generator 64 receives pulses from modulator 42 and produces a sweep voltage which, in cooperation with the action of the deflecting yoke 57, produces a radial sweep of the electron beam in cathode ray tube 52 in a manner which is well known in the art.

Figure 4:
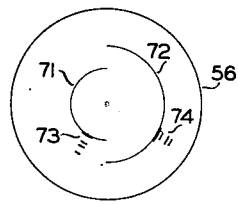
Fig. 4 is a view of the face of the cathode ray indicator showing the proper indication of the aircraft on its course.

In the operation of the system herein described, the pulses produced by range mark generator 61 in cooperation with delay circuit 58 and computer 59 occur at the proper time to produce a visible trace on screen 56, the distance of said trace from the center of the screen being a measure of the desired range to the respective beacon. Since these pulses occur on each sweep of the electron beam in tube 52, a pair of semicircular arcs is produced, the radii of which are indicative of the desired ranges to the two beacons. Fig. 4 shows the appearance of screen 56 of cathode ray tube 52 when the aircraft is on course. Arcs 71 and 72 are the range marks for beacons A and B, respectively, and trace groups 73 and 74 are the coded responses from beacons A and B, respectively. The on-course condition is indicated by coincidence of the first trace of each beacon response with the corresponding range mark.

In operating the system incorporating this invention, the points A, B, C, and D can be located and the line H—B constructed accurately on a map or chart prior to the beginning of the flight, so that the distances D—B, C—B and H—B can be measured. With contact arms 15 and 21 set at the starting ends of their respective potentiometers 14 and 19, the ratio between the values of variable resistors 12 and 13 is so adjusted that the output potential at relay contact 22 is proportional to the initial range D—B. Contact arms 15 and 21 are then set at the opposite, or final, ends of potentiometers 14 and 19 respectively, and the total value of resistors 12 and 13 adjusted to make the output voltage at contact 22 proportional to the final range C—B, without changing the ratio previously established. Finally, contact arms 15 and 21 are set in their midpositions, and the setting of voltage-divider 29 is so adjusted that the output potential at contact 22 is proportional to distance H—B. Contact arms 15 and 21 are then returned to their original positions at the starting ends of potentiometers 14 and 19 respectively. The potentiometer 27 provides at terminal 29 a voltage which is proportional to the range on the path AC to the track beacon A. Ground-speed shaft 30 would then be left uncoupled from the ground-speed measuring device until point D is reached in the flight, at which time the coupling would be effected. Thereafter, the operator can direct the pilot on the desired course which maintains coincidence of the beacon responses and corresponding range marks as described above.

It will be obvious to those skilled in the art that it would be possible to replace that portion of the network of Fig. 2 which supplies voltage to terminal 29 of relay 23 with a network identical to that which supplies voltage to terminal 22. By this means it would be possible to navigate the aircraft to a destination along a straight line course not necessarily over one of the beacons.

It will also be obvious that the system described herein might also be used to give intermittent checks on the position of the aircraft with respect to the desired straight-line course instead of continuous indication. This could be done by arranging shaft 30 to be manually adjusted to correspond to the ground position of the aircraft from time to time.

While there has been described what is at present considered to be the preferred embodiment of this invention, it will be obvious to those skilled in the art that various changes and modifications may be made therein without departing from the scope of the invention as set forth in the appended claims.

The invention claimed is:

1. A system on a craft for navigating said craft from an initial point to a destination point along a straight-line course with the aid of first and second beacons located respectively at first and second reference points, said system comprising radio-object locating means for obtaining first and second signals respectively respresentative of the actual distances of said craft from said first and second beacons, computer means for developing as a function of the ground speed of said craft third and fourth signals respectively representative of the distances said craft would be from said first and said second beacons if said craft were on said straight-line course, and circuit means coupled to said radio-object locating means and said computer means for comparing said first and third signals and said second and fourth signals to provide an indication of deviations from said straight-line course.

2. A system according to claim 1, where said computer means includes a first voltage source controlled in accordance with the ground speed of said craft for producing a first voltage varying linearly with the distance travelled by said craft from said initial point, a second voltage source controlled in accordance with the ground speed of said craft for producing a second voltage varying as the square of the difference between the distance travelled by said craft from said initial point and the distance from said initial point to the intersection of said straight-line course with the bisector of the angle formed by lines connecting said first beacon to said initial and destination points respectively, means for serially connecting said first and second voltage sources to produce a third voltage, and means to control said third signal in accordance with said third voltage.

3. A system in accordance with claim 2, wherein said initial point lies on a line connecting said second beacon and said destination point, and wherein said computer means further includes a third voltage source controlled in accordance with the ground speed of said craft for producing a fourth voltage proportional to the distance of said craft from said second beacon, and means to control said fourth signal in accordance with said fourth voltage.

4. A system in accordance with claim 3, wherein said radio object locating means includes means for alternately transmitting periodic interrogating pulses to said first and second beacons respectively, and means for receiving responding pulses from said first and second beacons respectively, said received responding pulses from said first and second beacons being said first and second signals respectively; wherein said means to control said third signal and said means to control said fourth signal include delay means for producing a time delay between signals applied as an input thereto and signals obtained as an output therefrom which is proportional to a control voltage applied thereto, means for selectively applying said third and fourth voltages as said control voltage to said delay means in synchronism with the transmission of interrogating pulses to said first and second beacons respectively, and means for applying pulses synchronized with said interrogating pulses as an input to said delay means; and wherein said circuit means includes a cathode ray tube, means operated in synchronism with said interrogating pulses for sweeping the electron beam of said cathode ray tube, and means for intensity modulating said electron beam with said first and second signals and the output of said delay means respectively.

5. A system according to claim 4, wherein said first voltage source comprises a first direct-current power supply having a positive and negative terminal, a first variable resistance having one end thereof connected to one terminal of said first power supply, a second variable resistance having one end thereof connected to the other terminal of said first power supply, a first linear-taper potentiometer connected between the other ends of said first and second resistances, said first and second variable resistances being adjusted to be so proportioned and to have such values that when the movable tap of said first potentiometer is at one end thereof the potential thereat is proportional to the distance between said initial point and said first beacon and when the movable tap of said potentiometer is at the other end thereof the potential thereat is proportional to the distance between said destination point and said first beacon, and means for moving the movable tap of said potentiometer from said one end to said other end thereof in accordance with the ground speed of said craft; wherein said second voltage source comprises a second direct-current power supply having a positive and a negative terminal, a voltage divider connected across the terminals of said second power supply for providing a voltage with respect to one terminal of said second power supply which is proportional to the distance of the intersection of said straight-line course and said bisector from said first beacon, a second linear-taper potentiometer having both ends thereof connected to said one terminal of said second power supply, a third resistance which is large relative to the resistance of said second potentiometer for applying the voltage at said voltage divider to the movable tap of said second potentiometer, and means for moving the movable tap of said second potentiometer from one end to the other end thereof in accordance with the ground speed of said craft, and wherein said means for serially connecting said first and second voltage sources consists of means for connecting the movable tap of said first potentiometer to said one terminal of said second power supply, whereby said third voltage appears at the movable tap of said second potentiometer.

RICHARD K. MOSHER.

REFERENCES CITED

The following references are of record in the file of this patent:

UNITED STATES PATENTS

| Number | Name | Date |
|---|---|---|
| 1,745,378 | Osnos | Feb. 4, 1930 |
| 2,066,949 | Ruiz | Jan. 5, 1937 |
| 2,070,178 | Pottenger, Jr., et al. | Feb. 9, 1937 |
| 2,116,625 | Grant | May 10, 1938 |
| 2,395,966 | Goldberg | Mar. 5, 1946 |
| 2,405,238 | Seeley | Aug. 6, 1946 |